(12) United States Patent
Sjöberg et al.

(10) Patent No.: US 12,413,783 B2
(45) Date of Patent: Sep. 9, 2025

(54) EXTENSION OF HEADER VALUES IN VIDEO AND IMAGE CODING UNITS

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 17/626,506

(22) PCT Filed: Jul. 10, 2020

(86) PCT No.: PCT/SE2020/050725
§ 371 (c)(1),
(2) Date: Jan. 12, 2022

(87) PCT Pub. No.: WO2021/010887
PCT Pub. Date: Jan. 21, 2021

(65) Prior Publication Data
US 2022/0248060 A1    Aug. 4, 2022

Related U.S. Application Data

(60) Provisional application No. 62/873,438, filed on Jul. 12, 2019.

(51) Int. Cl.
*H04N 19/70*    (2014.01)
*H04N 19/30*    (2014.01)

(52) U.S. Cl.
CPC ............. *H04N 19/70* (2014.11); *H04N 19/30* (2014.11)

(58) Field of Classification Search
CPC ...... H04N 19/70; H04N 19/174; H04N 19/46; H04N 19/172; H04N 19/188; H04N 19/31; H04N 19/44; H04N 19/597; H04N 19/58

(Continued)

(56) References Cited

U.S. PATENT DOCUMENTS

| 2015/0103907 | A1* | 4/2015 | Hendry | H04N 19/597 |
|  |  |  |  | 375/240.12 |
| 2016/0057441 | A1* | 2/2016 | Skupin | H04N 19/597 |
|  |  |  |  | 375/240.25 |

FOREIGN PATENT DOCUMENTS

EP    2984839 B1    5/2020

OTHER PUBLICATIONS

Karsten et al. (Study on future extension the maximum number of supported layers, 6. JCT-3V Meeting; Oct. 25, 2013-Nov. 1, 2013; Geneva; (The Joint Collaborative Team on 3D Video Coding Extension Development of ISO/IEC JTC1/SC29/WG11 and ITU-T SG.16 ), No. JCT3V-F0264 Oct. 30, 2013 (Oct. 30, 2013) (Year: 2013).*

(Continued)

*Primary Examiner* — Masum Billah
(74) *Attorney, Agent, or Firm* — Sage Patent Group

(57) ABSTRACT

A method of decoding an encoded image includes obtaining a layer identification, Layer ID, indicator from a first field of a header for a network abstraction layer, NAL, unit of the encoded image, determining whether the Layer ID indicator is less than a start value, in response to determining that the Layer ID indicator is not less than the start value, determining the Layer ID value based on the Layer ID indicator and based on an extension value provided in a second field of the header, and decoding the NAL unit based on the Layer ID (Continued)

value. Related decoders, encoding methods, encoders and computer program products are disclosed.

19 Claims, 8 Drawing Sheets

(58) Field of Classification Search
USPC .......................................................... 375/240
See application file for complete search history.

(56) References Cited

OTHER PUBLICATIONS

Extended European Search Report for European Patent Application No. 20840178.6 mailed Jun. 30, 2023, 9 pages.
Karsten Suchring et al., JCTVC-O0365, "Study on Future Extension the Maximum Number of Supported Layers", Joint Collaborative Team on Video Casting, JTC 1/SC 29/WG 11, 15th Meeting, Geneva, Switzerland, Oct. 23-Nov. 1, 2013, 7 pages.
International Search Report and Written Opinion of the International Searching Authority, PCT/SE2020/050725, mailed Oct. 19, 2020, 14 pages.
Nokia, JVET-O1042, AHG17: Varying-length NAL unit header, Joint Video Experts Team (JVET) of ITU-T SG 16 WP 3 and ISO/IEC JTC 1/SC 29/WG 11, 15$^{th}$ Meeting, Gothenburg, Sweden, Jul. 3-12, 2019, 4 pages.
Ericsson, JVET-P0362, AHG17: NAL unit header extension to extend the number of layers, Joint Video Experts Team (JVET) of ITU-T SG 16 WP 3 and ISO/IEC JTC 1/SC 29/WG 11, 16$^{th}$ Meeting, Geneva, Switzerland, Oct. 1-11, 2019, 3 pages.
Futurewei Technologies, Inc., JVET-O1037-v1, AGH17: On AL unit header, Joint Video Experts Team (JVET) of ITU-T SG 16 WP 3 and ISO/IEC JTC 1/SC 29/WG 11, 15$^{th}$ Meeting, Gothenburg, Sweden, Jul. 3-12, 2019, 4 pages.
Bross, Benjamin et al., JVET-N1001-v7 (draft), Versatile Video Coding (Draft 5), Joint Video Experts Team (JVET) of ITU-T SG 16 WP 3 and ISO/IEC JTC 1/SC 29/WG 11, 14$^{th}$ Meeting, Geneva, Switzerland, Mar. 19-27, 2019, 384 pages.
Sharp Labs of America, Inc., JVET-O0179-v2 (draft), On NAL Unit Header Design, Joint Video Experts Team (JVET) of ITU-T SG 16 WP 3 and ISO/IEC JTC 1/SC 29/WG 11, 15$^{th}$ Meeting, Gothenburg, Sweden, Jul. 3-12, 2019, 411 pages.

* cited by examiner

EXTENSION OF HEADER VALUES IN VIDEO AND IMAGE CODING UNITS

CROSS-REFERENCE TO RELATED APPLICATIONS

This application is a 35 U.S.C. § 371 national stage application of PCT International Application No. PCT/SE2020/050725 filed on Jul. 10, 2020, which in turn claims domestic priority to U.S. Provisional Patent Application No. 62/873,438, filed on Jul. 12, 2019, the disclosures and content of which are incorporated by reference herein in their entirety.

TECHNICAL FIELD

The present disclosure relates generally to video and image coding, and more particularly, to encoding and decoding of header information in coding units.

BACKGROUND

High Efficiency Video Coding (HEVC) is a block-based video codec standardized by ITU-T and MPEG that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before being transmitted together with necessary prediction parameters such as prediction mode and motion vectors, which are also entropy coded. The decoder performs entropy decoding, inverse quantization and inverse transformation to obtain the residual, and then adds the residual to an intra- or inter-frame prediction to reconstruct a picture.

MPEG and ITU-T is working on the successor to HEVC within the Joint Video Exploratory Team (JVET). The name of this video codec under development is Versatile Video Coding (VVC).

A video sequence consists of a series of images where each image consists of one or more components. Each component can be described as a two-dimensional rectangular array of sample values. It is common that an image in a video sequence consists of three components; one luma component Y where the sample values are luma values and two chroma components Cb and Cr, where the sample values are chroma values. It is also common that the dimensions of the chroma components are smaller than the luma components by a factor of two in each dimension. For example, the size of the luma component of an HD image would be 1920×1080 and the chroma components would each have the dimension of 960×540. Components are sometimes referred to as color components. A video sequence may consist of a single picture.

A block is one two-dimensional array of samples. In video coding, each component is split into blocks and the coded video bitstream consists of a series of coded blocks. It is common in video coding that the image is split into units that cover a specific area of the image. Each unit consists of all blocks from all components that make up that specific area and each block belongs fully to one unit. The macroblock in H.264 and the Coding unit (CU) in HEVC are examples of units.

A block can alternatively be defined as a two-dimensional array that a transform used in coding is applied to. These blocks are known under the name "transform blocks." Alternatively, a block can be defined as a two-dimensional array that a single prediction mode is applied to. These blocks can be called "prediction blocks." In this application, the word block is not tied to one of these definitions, and the descriptions herein can apply to either definition.

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header called the NAL unit header. The syntax for the NAL unit header for HEVC is shown in Table 1 and starts with a forbidden_zero_bit that shall always be equal to 0 to prevent start code emulations. Without it, some MPEG systems might confuse the HEVC video bitstream with other data, but the 0 bit in the NAL unit header makes all possible HEVC bitstreams uniquely identifiable as HEVC bitstreams. The nal_unit_type, nuh_layer_id and nuh_temporal_id_plus1 code words specify the NAL unit type of the NAL unit that identifies what type of data is carried in the NAL unit, the layer ID and the temporal ID for which the NAL unit belongs to. The NAL unit type indicates and specifies how the NAL unit should be parsed and decoded.

The rest of the bytes of the NAL unit is payload of the type indicated by the NAL unit type. A bitstream consists of a series of concatenated NAL units.

TABLE 1

HEVC NAL unit header syntax (design A)

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

The syntax for the NAL unit header in the current version of the VVC draft, JVET-N1001-v7, is shown in Table 2.

TABLE 2

NAL unit header syntax for current version of VVC draft (design B)

| | Descriptor |
|---|---|
| nal_unit_header( ) { | |
|   zero_tid_required_flag | u(1) |
|   nuh_temporal_id_plus1 | u(3) |
|   nal_unit_type_lsb | u(4) |
|   nuh_layer_id | u(7) |
|   nuh_reserved_zero_bit | u(1) |
| } | |

At the 15th JVET meeting in Gothenburg, three different NAL unit header designs were presented and discussed. They are shown in Table 3, Table 4 and Table 5

TABLE 3

NAL unit header syntax from JVET document JVET-O0179 (design C)

|  | Descriptor |
|---|---|
| nal_unit_header( ) { |  |
|   nuh_layer_id | u(8) |
|   nal_unit_type | u(5) |
|   nuh_temporal_id_plus1 | u(3) |
| } |  |

TABLE 4

NAL unit header syntax from JVET document JVET-O0179 (design D)

|  | Descriptor |
|---|---|
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
| } |  |

TABLE 5

NAL unit header syntax from JVET document JVET-O1037 (design E)

|  | Descriptor |
|---|---|
| nal_unit_header( ) { |  |
|   forbidden_zero_bit | f(1) |
|   nuh_layer_id | u(6) |
|   nal_unit_type | u(5) |
|   nuh_temporal_id_plus1 | u(3) |
|   nuh_reserved_zero_bit | u(1) |
| } |  |

In all five NAL unit header designs presented above, design A to design E, the number of layers is limited. It is therefore beneficial to incorporate an extension mechanism for the NAL unit header such that the number of layer ID values for the NAL units can be increased. This is provided for the NAL unit headers designs above as follows:

In Design A, the nuh_layer_id value of 63 is reserved to provide a layer extension mechanism. The idea is that if the value of 63 is signalled, there is more data following the NAL unit header that contains a longer layer ID.

Design B is the same as in Design A, but the value 127 for nuh_layer_id_plus1 is reserved instead of 63.

Design C reserves values 127-187 that can be used to extend the number of layers.

Design D is similar but reserves values 32-63.

In Design E it is possible to use nuh_reserved_zero_bit as an extension. The value of 1 is reserved and can be used to extend the NAL unit header by adding additional NAL unit header extension bytes after the NAL unit header. The extension bytes may be used to carry extended layer ID values, but that is not disclosed in JVET-O1037.

A decoder or bitstream parser can conclude how the NAL unit should be handled, e.g. parsed and decoded, after looking at the NAL unit header. The rest of the bytes of the NAL unit is payload of the type indicated by the NAL unit type. A bitstream consists of a series of concatenated NAL units.

The NAL unit type indicates and defines how the NAL unit should be parsed and decoded. A VCL NAL unit provides information about the picture type of the current picture. The NAL unit types of the current version of the VVC draft are shown in Table 6.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 6

NAL unit types in the current version of the VVC draft

| NalUnitType | Name of NalUnitType | Content of NAL unit and RBSP syntax structure | NAL unit type class |
|---|---|---|---|
| 0 | PPS_NUT | Picture parameter set pic_parameter_set_rbsp( ) | non-VCL |
| 1 | AUD_NUT | Access unit delimiter access_unit_delimiter_rbsp( ) | non-VCL |
| 2<br>3 | PREFIX_SEI_NUT<br>SUFFIX_SEI_NUT | Supplemental enhancement information sei_rbsp( ) | non-VCL |
| 4 | APS_NUT | Adaptation parameter set adaptation_parameter_set_rbsp( ) | non-VCL |
| 5 . . . 7 | RSV_NVCL5 . . . RSV_NVCL7 | Reserved | non-VCL |
| 8 | TRAIL_NUT | Coded slice of a non-STSA trailing picture slice_layer_rbsp( ) | VCL |
| 9 | STSA_NUT | Coded slice of an STSA picture slice_layer_rbsp( ) | VCL |
| 10 | RADL_NUT | Coded slice of a RADL picture slice_layer_rbsp( ) | VCL |
| 11 | RASL_NUT | Coded slice of a RASL picture slice_layer_rbsp( ) | VCL |
| 12 . . . 15 | RSV_VCL_12 . . . RSV_VCL_15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | VPS_NUT | Video parameter set video_parameter_set_rbsp( ) | non-VCL |
| 21 . . . 23 | RSV_NVCL21 . . . RSV_NVCL23 | Reserved | non-VCL |
| 24<br>25 | IDR_W_RADL<br>IDR_N_LP | Coded slice of an IDR picture slice_layer_rbsp( ) | VCL |
| 26 | CRA_NUT | Coded slice of a CRA picture slice_layer_rbsp( ) | VCL |
| 27 | GRA_NUT | Coded slice of a gradual random access picture slice_layer_rbsp( ) | VCL |
| 28 . . . 31 | UNSPEC28 . . . UNSPEC31 | Unspecified | non-VCL |

In HEVC, all pictures are associated with a TemporalId value which specifies what temporal layer the picture belongs to. TemporalId values are decoded from the nuh_temporal_id_plus1 syntax element in the NAL unit header. In HEVC, the encoder is required to set TemporalId values such that pictures belonging to a lower layer are perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC specification that the encoder must comply with. For instance, it is not allowed for a picture of a temporal layer to reference a picture of a higher temporal layer.

Layers are defined in the current VVC draft as a set of VCL NAL units that all have a particular value of NuhLayerId and the associated non-VCL NAL units.

A layer access unit in the current VVC draft is defined as a set of NAL units for which the VCL NAL units all have a particular value of NuhLayerId, that are associated with each other according to a specified classification rule, that are consecutive in decoding order, and that contain exactly one coded picture.

A coded layer video sequence (CLVS) in the current version of VVC draft is defined as a sequence of layer access units that consists, in decoding order, of a CLVS layer access unit, followed by zero or more layer access units that are not CLVS layer access units, including all subsequent layer access units up to but not including any subsequent layer access unit that is a CLVS layer access unit.

The relation between the layer access units and coded layer video sequences is illustrated in FIG. 8.

In the current version of VVC, layers are coded independently from each other, i.e. a layer with e.g. NuhLayerId 0 may not predict video data from another layer with e.g. NuhLayerId 1. In the next version of the VVC draft scalability support was adopted, which allows dependent coding between layers.

For single layer coding in HEVC and the current VVC draft, an access unit (AU) is the coded representation of a single picture. An AU may consist of several video coding layer (VCL) NAL units as well as non-VCL NAL units. An access unit may optionally start with an access unit delimiter (AUD) which indicates the start of the access unit and the type of the slices allowed in the picture, i.e. I, I-P or I-P-B.

An intra random access point (IRAP) picture in HEVC is a picture that does not refer to any pictures other than itself for prediction in its decoding process. The first picture in the bitstream in decoding order in HEVC must be an IRAP picture but an IRAP picture may additionally also appear later in the bitstream. HEVC specifies three types of IRAP pictures, the broken link access (BLA) picture, the instantaneous decoder refresh (IDR) picture and the clean random access (CRA) picture A coded video sequence (CVS) in HEVC is a series of access units starting at an IRAP access unit up to, but not including the next IRAP access unit in decoding order.

IDR pictures always start a new CVS. An IDR picture may have associated random access decodable leading (RADL) pictures. An IDR picture does not have associated Random-access skipped leading (RASL) pictures.

A BLA picture also starts a new CVS and has the same effect on the decoding process as an IDR picture. However, a BLA picture in HEVC may contain syntax elements that specify a non-empty set of reference pictures. A BLA picture may have associated RASL pictures, which are not output by the decoder and may not be decodable, as they may contain references to pictures that may not be present in the bitstream. A BLA picture may also have associated RADL pictures, which are decoded. BLA pictures are not defined in the current version of VVC.

A CRA picture may have associated RADL or RASL pictures. As with a BLA picture, a CRA picture may contain syntax elements that specify a non-empty set of reference pictures. For CRA pictures, a flag can be set to specify that the associated RASL pictures are not output by the decoder, because they may not be decodable, as they may contain references to pictures that are not present in the bitstream. A CRA may start a CVS.

In the current version of the VVC draft, a CVS is started at a CVS start (CVSS) access unit, which may contain an IRAP picture, i.e, an IDR or a CRA picture, or a gradual random access (GRA) picture.

GRA pictures are essentially used for random access in bitstreams encoded for low-delay coding where a full IRAP picture would cause too much delay. A GRA picture may use gradual intra refresh that updates the video picture by picture where each picture is only partially intra coded. It is signaled with the GRA picture when the video is fully refreshed and ready for output, given that the bitstream was tuned into at the GRA picture. A GRA may start a CVS.

SUMMARY

A method according to some embodiments of decoding an encoded image includes obtaining a layer identification, Layer ID, indicator from a first field of a header for a network abstraction layer, NAL, unit of the encoded image, determining whether the Layer ID indicator is less than a start value, in response to determining that the Layer ID indicator is not less than the start value, determining the Layer ID value based on the Layer ID indicator and based on an extension value provided in a second field of the header, and decoding the NAL unit based on the Layer ID value.

In some embodiments, determining the Layer ID value from the Layer ID indicator and from the extension value includes generating the Layer ID value according to the formula Layer ID value=V0+(F−V0)*$2^n$+S where V0 is the start value, F is determined from the Layer ID indicator, S is the extension value, and n is a number of bits used to represent the extension value.

In some embodiments, determining the Layer ID value from the Layer ID indicator and from the extension value includes generating the Layer ID value according to the formula Layer ID value=V0+((F−V0)<<n)+S where V0 is the start value, F is determined from the Layer ID indicator, S is the extension value, and n is a number of bits used to represent the extension value.

In some embodiments, F may be equal to the Layer ID indicator. In some embodiments, In some embodiments, F may be equal to the Layer ID indicator minus a constant. In some embodiments, v0 may be conditioned to be smaller than F.

In some embodiments, determining the Layer ID value of the NAL unit from the Layer ID indicator in response to determining that the Layer ID indicator is less than the start value includes determining that the Layer ID value may be equal to the Layer ID indicator.

The method may further include, in response to determining that the Layer ID indicator may be not less than the start value, determining that the second field may be present.

In some embodiments, the first field of the header may be a nuh_layer_id field. The second field of the header may be a nuh_layer_id_extension_value field.

The method may further include determining whether the Layer ID indicator is less than a second value, wherein determining the Layer ID value from the Layer ID indicator and from the extension value may be performed in response to determining that the Layer ID indicator is less than the second value.

The encoded image may include part of an encoded video stream.

A method of decoding an encoded image according to some embodiments includes obtaining a layer identification, Layer ID, indicator from a first field of a header for a network abstraction layer, NAL, unit of the encoded image, obtaining an extension value provided in a second field of the header, determining a Layer ID value for the NAL unit from the Layer ID indicator and from the extension value, and decoding the NAL unit based on the Layer ID value.

A method of decoding an encoded image according to some embodiments includes obtaining a parameter indicator from a first field of a header for a network abstraction layer, NAL, unit of the encoded image, determining whether the parameter indicator is within a predetermined range, in response to determining that the parameter indicator is within the predetermined range, determining a value of a first parameter of the NAL unit based on the parameter indicator, in response to determining that the parameter indicator is outside the predetermined range, determining the first parameter of the NAL unit based on the parameter indicator and based on an extension value provided in a second field of the header, and decoding the NAL unit based on the first parameter.

In some embodiments, the parameter indicator includes a layer identification, Layer ID, indicator, and the first parameter includes a Layer ID value. Determining whether the parameter indicator is within the predetermined range may include determining whether the parameter indicator is less than a start value.

A decoder according to some embodiments includes a processing circuitry, and a memory coupled to the processing circuitry, wherein the memory includes computer readable instructions that when executed by the processing circuitry cause the processing circuitry to perform operations of obtaining a layer identification, Layer ID, indicator from a first field of a header for a network abstraction layer, NAL, unit of the encoded image, determining whether the Layer ID indicator is less than a start value, in response to determining that the Layer ID indicator is less than the start value, determining a Layer ID value of the NAL unit based on the Layer ID indicator, in response to determining that the Layer ID indicator is not less than the start value, determining the Layer ID value based on the Layer ID indicator and based on an extension value provided in a second field of the header, and decoding the NAL unit based on the Layer ID value.

A decoder according to some embodiments, wherein the decoder is adapted to perform operations of obtaining a layer identification, Layer ID, indicator from a first field of a header for a network abstraction layer, NAL, unit of the encoded image, determining whether the Layer ID indicator is less than a start value, in response to determining that the Layer ID indicator is less than the start value, determining a Layer ID value of the NAL unit based on the Layer ID indicator, in response to determining that the Layer ID indicator is not less than the start value, determining the Layer ID value based on the Layer ID indicator and based on an extension value provided in a second field of the header, and decoding the NAL unit based on the Layer ID value.

A computer program product including a non-transitory storage medium including program code to be executed by processing circuitry of a decoder, whereby execution of the program code causes the network node to perform operations of obtaining a layer identification, Layer ID, indicator from a first field of a header for a network abstraction layer, NAL, unit of the encoded image, determining whether the Layer ID indicator is less than a start value, in response to determining that the Layer ID indicator is less than the start value, determining a Layer ID value of the NAL unit based on the Layer ID indicator, in response to determining that the Layer ID indicator is not less than the start value, determining the Layer ID value based on the Layer ID indicator and based on an extension value provided in a second field of the header, and decoding the NAL unit based on the Layer ID value.

A method of encoding an image includes generating a layer identification, Layer ID, value for a network abstraction layer, NAL, unit of the image, determining whether the Layer ID value is less than a start value, in response to determining that the Layer ID value is less than the start value, encoding the Layer ID value in a first field of an NAL header for the NAL unit, in response to determining that the Layer ID value may be not less than the start value, encoding the Layer ID value in the first field of the NAL header and a second field of the NAL header, and outputting the NAL unit including the NAL header.

In some embodiments, encoding the Layer ID value includes encoding a Layer ID indicator in the first field of the NAL header and an extension value in the second field of the NAL header, wherein the Layer ID indicator and the extension value may be derived from the Layer ID value.

In some embodiments, the Layer ID indicator, F, and the extension value, S, may be generated according to the formulas $S=(\text{Layer ID value}-V0)\%2^n$ and $F=(\text{Layer ID value}-V0-S)\!>\!>\!n+V0$, where V0 is the start value and n is a number of bits used to represent the extension value.

In some embodiments, the Layer ID indicator, F, and the extension value, S, may be generated according to the formulas $S=(\text{Layer ID value}-V0)\ \&\ (2^n-1)$ and $F=(\text{Layer ID value}-V0-S)\!>\!>\!n+V0$, where V0 is the start value and n is a number of bits used to represent the extension value.

In some embodiments, wherein the start value may be 127, and in further embodiments, the start value may be 32.

In some embodiments, the first field of the NAL header may be a nuh_layer_id field. The second field of the NAL header may be a nuh_layer_id_extension_value field.

The method may further include determining whether the Layer ID value is less than a second value, wherein encoding the Layer ID value in the first field of the NAL header and the second field of the NAL header may be performed in response to determining that the Layer ID value is less than the second value.

A method of encoding an image according to further embodiments includes generating a layer identification, Layer ID, value for a network abstraction layer, NAL, unit of the image, encoding the Layer ID value in the first field of a NAL header for the NAL unit and a second field of the NAL header, wherein encoding the Layer ID value includes encoding a Layer ID indicator in the first field of the NAL header and an extension value in the second field of the NAL header, wherein the Layer ID indicator and the extension value may be derived from the Layer ID value, and outputting the NAL unit including the NAL header.

An encoder according to some embodiments includes a processing circuitry, and a memory coupled to the processing circuitry, wherein the memory includes computer readable instructions that when executed by the processing circuitry cause the processing circuitry to perform operations of generating a layer identification, Layer ID, value for a network abstraction layer, NAL, unit of the image, determining whether the Layer ID value is less than a start value, in response to determining that the Layer ID value is less than the start value, encoding the Layer ID value in a first field of an NAL header for the NAL unit, in response to determining that the Layer ID value may be not less than the start value, encoding the Layer ID value in the first field of the NAL header and a second field of the NAL header, and outputting the NAL unit including the NAL header.

In some embodiments, encoding the Layer ID value includes encoding a Layer ID indicator in the first field of the NAL header and an extension value in the second field of the NAL header, wherein the Layer ID indicator and the extension value are derived from the Layer ID value.

An encoder according to some embodiments, wherein the encoder is adapted to perform operations of generating a layer identification, Layer ID, value for a network abstraction layer, NAL, unit of the image, determining whether the Layer ID value is less than a start value, in response to determining that the Layer ID value is less than the start value, encoding the Layer ID value in a first field of an NAL header for the NAL unit, in response to determining that the Layer ID value may be not less than the start value, encoding the Layer ID value in the first field of the NAL header and a second field of the NAL header, and outputting the NAL unit including the NAL header.

In some embodiments, encoding the Layer ID value includes encoding a Layer ID indicator in the first field of the NAL header and an extension value in the second field of the NAL header, wherein the Layer ID indicator and the extension value may be derived from the Layer ID value.

A computer program product including a non-transitory storage medium including program code to be executed by processing circuitry of an encoder, whereby execution of the program code causes the network node to perform operations of generating a layer identification, Layer ID, value for a network abstraction layer, NAL, unit of the image, determining whether the Layer ID value is less than a start value, in response to determining that the Layer ID value is less than the start value, encoding the Layer ID value in a first field of an NAL header for the NAL unit, in response to determining that the Layer ID value may be not less than the start value, encoding the Layer ID value in the first field of the NAL header and a second field of the NAL header, and outputting the NAL unit including the NAL header.

In some embodiments, encoding the Layer ID value includes encoding a Layer ID indicator in the first field of the NAL header and an extension value in the second field of the NAL header, wherein the Layer ID indicator and the extension value may be derived from the Layer ID value.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Figure 1:
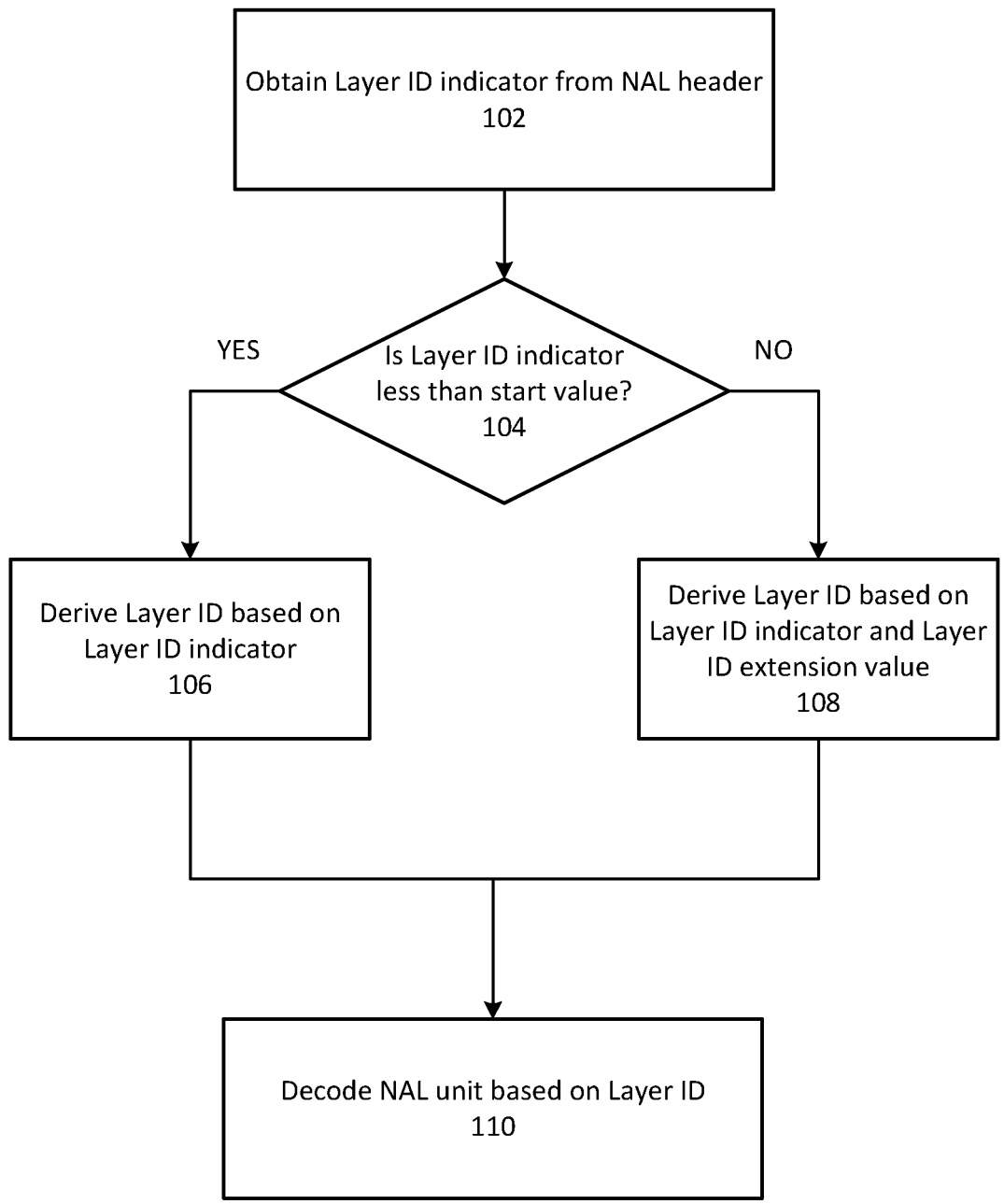
FIGS. 1 to 3 are flowcharts illustrating operations of a decoder according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The NAL unit header designs described above which use only one value to extend the number of layer ID values are inefficient and may not be flexible enough to handle a sufficient number of layer ID values.

According to some embodiments, an optional extension value is included in an NAL header, and the layer ID may be generated from the extension value and from the value included in the layer ID field of the NAL header. For example, some embodiments described herein use multiple values derived from of one or more first syntax elements to decode a parameter as equal to $V0+(F-V0)*2^N+S$ or $V0+((F-V0)<<N)+S$, where F is the value of the one or more first syntax elements, V0 is a start value of a range of values, N is the number of bits used for a one or more second syntax elements, and S is the value of a second value derived from the one or more second syntax elements.

The parameter may be a layer ID value or any other value used in the decoding process to decode a picture.

Some embodiments may provide a more compact design where an extended range of decoder values are efficiently provided using an extension mechanism.

A decoder may derive a parameter by following some or all of the following steps.

First, the decoder determines whether the value derived from one or more first syntax elements is within a range of values from V0 and V1, inclusive, where V0 and V1 are not the same value (i.e. the range consist of at least two values). In some embodiments, the first syntax elements may include a layer ID field of a NAL header.

If the value is not within the range of values, the decoder may derive the parameter from the one or more first syntax elements only.

If the value is within the range of values, the decoder may derive the parameter as follows:

The decoder derives a second value from one or more second syntax elements, the one or more second syntax elements consisting of N bits. In some embodiments, the second syntax elements may include an extension field of a NAL header.

The decoder then derives the parameter according to the following equation:

$$Parameter = V0 + (F-V0)*2^N + S \qquad [1]$$

where F is the value of the one or more first syntax elements, V0 is the start value of the range of values, N is the number of bits for the one or more second syntax elements, and S is the value of the second syntax element.

Alternatively, the parameter may be derived according to the formula:

$$\text{Parameter} = V0 + ((F - V0) << N) + S \text{(where} << \text{is the left-shift operator)} \quad [2]$$

The decoder value may be a layer ID value or any other value used in the decoding process to decode a picture.

Table 7 illustrates an example of a NAL header format that includes an optional extension field nuh_layer_id_extension_value:

TABLE 7

| Design C with layer extension | |
| --- | --- |
|  | Descriptor |
| nal_unit_header( ) { |  |
|   nuh_layer_id | u(8) |
|   nal_unit_type | u(5) |
|   nuh_temporal_id_plus1 | u(3) |
|   if ( nuh_layer_id >= 127 && nuh_layer_id < 127+x) |  |
|     nuh_layer_id_extension_value | u(8) |
| } |  |

The nuh_layer_id_extension_value may only be present if the layer ID field (nuh_layer_id) is within a predetermined range. For example, the nuh_layer_id_extension_value may only be present if the layer ID field (nuh_layer_id) is within a range of 127<nuh_layer_id<127+x, where x is an integer greater than 1. In some embodiments, the nuh_layer_id_extension_value may only be present if the layer ID field (nuh_layer_id) is greater than a predetermined value. For example, the nuh_layer_id_extension_value may only be present if the layer ID field (nuh_layer_id) is equal to or larger than 127.

In some cases, the value of 127+x may represent a highest allowed value of the nuh_layer_id field of the NAL header. For example, the nuh_layer_id field of the NAL header may be limited to a value smaller than 187.

In the present example, the layer ID value (LayerID) in this example is derived as follows:

If nuh_layer_id is smaller than 127, then LayerID is set equal to nuh_layer_id.

Otherwise, if nuh_layer_id is smaller than 127+x, LayerID is determined according to Equation [1] above as:

$$\text{Layer ID} = 127 + ((\text{nuh\_layer\_id} - 127) * 2^8) + \text{nuh\_layer\_id\_extension\_value} \quad [3]$$

Alternatively, the value of the Layer ID may be derived according to Equation [2] as:

$$\text{Layer ID} = 127 + ((\text{nuh\_layer\_id} - 127) << 8) + \text{nuh\_layer\_id\_extension\_value} \quad [4]$$

In this regard, the value of the nuh_layer_id field functions as a parameter indicator, and in particular as a layer ID indicator. When the value of the nuh_layer_id field is less than 127, the layer ID is equal to the value of the nuh_layer_id field. However, when the nuh_layer_id field is 127 or more, and in some cases between 127 and 127+x, the layer ID is derived from both the value of the nuh_layer_id field as well as the extension field nuh_layer_id_extension_value.

Table 8A illustrates example values of nuh_layer_id and nuh_layer_id_extension_value for various Layer ID values.

TABLE 8A

Example values of nuh_layer_id, nuh_layer_id extension and Layer ID

| nuh_layer_id | nuh_layer_id_extension_value | Layer ID |
| --- | --- | --- |
| 1 | n/a | 1 |
| ... | ... | ... |
| 125 | n/a | 125 |
| 126 | n/a | 126 |
| 127 | 0 | 127 |
| 127 | 1 | 128 |
| 127 | 2 | 129 |
| ... | ... | ... |
| 127 | 255 | 382 |
| 128 | 0 | 383 |
| 128 | 1 | 384 |
| ... | ... | ... |

Table 8B illustrates example values of nuh_layer_id and nuh_layer_id_extension_value for various Layer ID values using a start value of 32.

TABLE 8B

Example values of nuh_layer_id, nuh_layer_id extension and Layer ID

| nuh_layer_id | nuh_layer_id_extension_value | Layer ID |
| --- | --- | --- |
| 1 | n/a | 1 |
| ... | ... | ... |
| 30 | n/a | 30 |
| 31 | n/a | 31 |
| 32 | 0 | 32 |
| 32 | 1 | 33 |
| 32 | 2 | 34 |
| ... | ... | ... |
| 32 | 255 | 287 |
| 33 | 0 | 288 |
| 33 | 1 | 289 |
| ... | ... | ... |

An example based on Design D is illustrated in Table 9. The NAL unit header format shown in Table 9 includes a 6-bit nuh_layer_id field and an optional 8-bit nuh_layer_extension_value field that is present if the value of nuh_layer_id is 32 or more.

TABLE 9

| Design D with layer extension | |
| --- | --- |
|  | Descriptor |
| nal_unit_header( ) { |  |
|   forbidden_zero_bit | f(1) |
|   nuh_reserved_zero_bit | u(1) |
|   nuh_layer_id | u(6) |
|   nal_unit_type | u(5) |
|   nuh_temporal_id_plus1 | u(3) |
|   if ( nuh_layer_id >= 32 && nuh_layer_id < 32+x) |  |
|     nuh_layer_id_extension_value | u(8) |
| } |  |

In a variant of this example, the "&& nuh_layer_id<32+x" is not present.

The layer ID value (LayerID) in this example is derived as follows:

If nuh_layer_id is smaller than 32, then LayerID is set equal to nuh_layer_id.

Otherwise, if nuh_layer_id is smaller than 32+x (or alternatively, if nuh_layer_id is equal to or larger than 32), LayerID is set equal to 32+((nuh_layer_id−32)<<8)+nuh_layer_id_extension_value. V0 is preferably set equal to 32.

From the encoding side, the values of the layer ID indicator (nuh_layer_id) and the extension value (nuh_layer_id_extension_value) may be determined from the Layer ID value and the start value V0 according to the following equations:

$$S = (\text{Layer ID value} - V0)\%2^n \text{ (where \% is the modulo operator)} \quad [5a]$$

$$F = (\text{Layer ID value} - V0 - S) >> n + V0 \quad [6a]$$

where F is the layer ID indicator (nuh_layer_id) and S is the extension value (nuh_layer_id_extension_value).

Alternatively, the following equations can be used to derive S and F:

$$S = (\text{Layer ID value} - V0) \& (2^n - 1) \text{ (where \& is the binary AND operator)} \quad [5b]$$

$$F = (\text{Layer ID value} - V0 - S) >> n + V0 \quad [6b]$$

Operations of a decoder according to some embodiments are illustrated in the flowchart of FIG. 1. As shown therein, a method of decoding an encoded image may include obtaining (102) a layer identification, Layer ID, indicator from a first field of a header for a network abstraction layer, NAL, unit of the encoded image. The decoder then determines (104) whether the Layer ID indicator is less than a start value V0. If the Layer ID indicator is less than the start value, operations proceed to block 106, where the decoder derives a Layer ID value of the NAL unit based on the Layer ID indicator alone. In particular, the Layer ID value may be determined to be equal to the layer ID indicator.

If the decoder determines at block 104 that the Layer ID indicator is not less than the start value, operations proceed to block 108, where the decoder determines the Layer ID value based on the Layer ID indicator and based on an extension value provided in a second field of the header. Once the Layer ID value has been derived, the decoder decodes (110) the NAL unit based on the determined Layer ID value.

The Layer ID value may be derived from the Layer ID indicator and from the extension value according to the formula:

$$\text{Layer ID} = V0 + (F - V0) * 2^n + S \quad [7]$$

where V0 is the start value, F is determined from the Layer ID indicator, S is the extension value, and n is a number of bits used to represent the extension value.

In some embodiments, the Layer ID value may be derived from the Layer ID indicator and from the extension value according to the formula:

$$\text{Layer ID value} = V0 + ((F - V0) << n) + S \quad [8]$$

where V0 is the start value, F is determined from the Layer ID indicator, S is the extension value, and n is a number of bits used to represent the extension value.

In some embodiments, F may be equal to the Layer ID indicator. In other embodiments, the value of F may be derived from the Layer ID indicator. For example, F may be equal to the Layer ID indicator minus 1.

When the Layer ID indicator is less than the start value, the Layer ID value may be set to be equal to the Layer ID indicator.

In some embodiments, the start value may be 127, while in other embodiments, the start value may be 32. In other embodiments, another start value may be used.

The first field of the header may be a nuh_layer_id field, while the second field of the header may be a nuh_layer_id_extension_value field.

The method may further include determining whether the Layer ID indicator is less than a second value (e.g., V0+x), and determining the Layer ID value from the Layer ID indicator and from the extension value may be performed in response to determining that the Layer ID indicator is less than the second value. Values equal to or larger than the second value may be forbidden or reserved for other uses.

The encoded image may include an encoded video stream.

Figure 2:
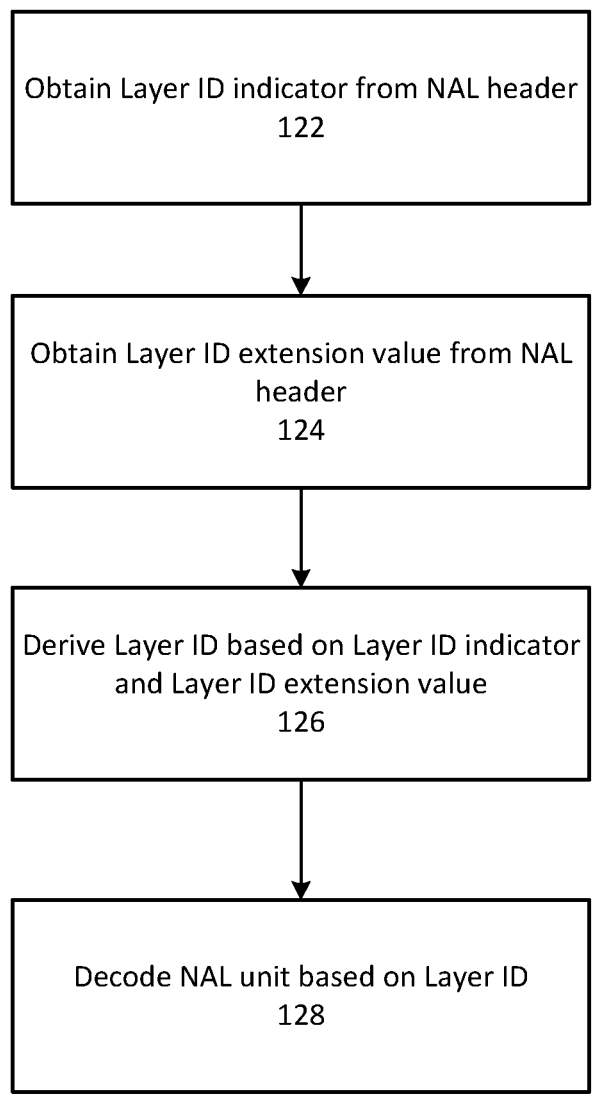

A method of decoding an encoded image according to further embodiments is illustrated in FIG. 2. As shown therein, the method may include obtaining (122) a layer identification, Layer ID, indicator from a first field of a header for a network abstraction layer, NAL, unit of the encoded image, obtaining (124) an extension value provided in a second field of the header, determining (126) a Layer ID value for the NAL unit from the Layer ID indicator and from the extension value, and decoding (128) the NAL unit based on the Layer ID value.

Figure 3:
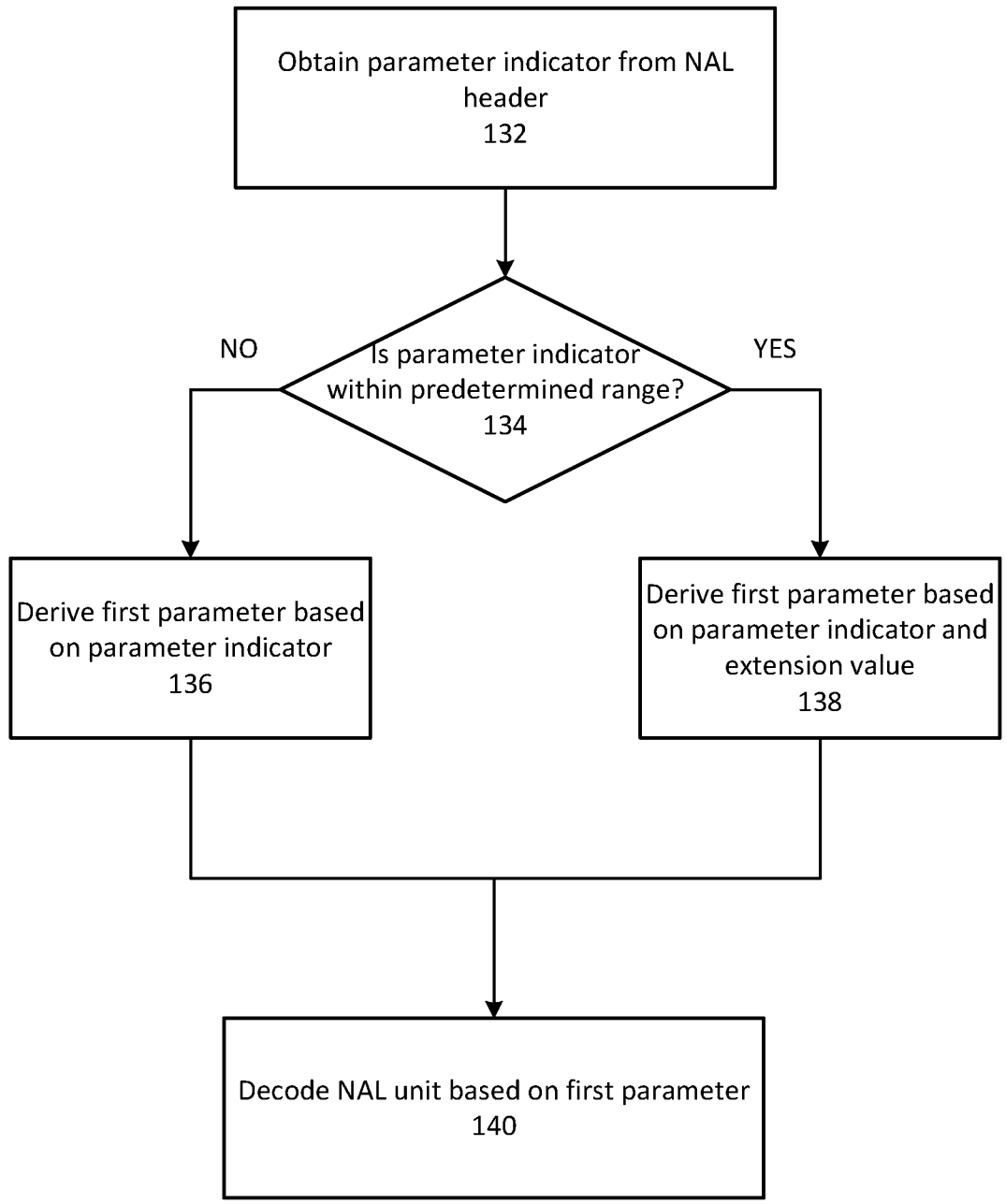

Operations of a decoder according to further embodiments are illustrated in the flowchart of FIG. 3. As shown therein, a method of decoding an encoded image may include obtaining (132) a parameter indicator from a first field of a header for a network abstraction layer, NAL, unit of the encoded image. The decoder then determines (134) whether the parameter indicator is within a predetermined range. If the parameter indicator is outside the predetermined range, operations proceed to block 136, where the decoder derives a first parameter of the NAL unit based on the parameter indicator alone. In particular, the first parameter may be determined to be equal to the parameter indicator.

If the decoder determines at block 134 that the parameter indicator is within the predetermined range, operations proceed to block 138, where the decoder determines the first parameter based on the parameter indicator and based on an extension value provided in a second field of the header. Once the first parameter has been derived, the decoder decodes (140) the NAL unit based on the determined first parameter.

The parameter indicator may include a layer identification, Layer ID, indicator, and the first parameter may include a Layer ID value. Determining whether the parameter indicator is within the predetermined range may include determining whether the parameter indicator is less than a start value.

A decoder (400) according to some embodiments is adapted to perform operations according to any of FIGS. 1 to 3. For example, a decoder (400) according to some embodiments includes a processing circuitry (430), and a memory (440) coupled to the processing circuitry, wherein the memory includes computer readable instructions that when executed by the processing circuitry cause the processing circuitry to perform operations illustrated in FIGS. 1 to 3.

Some embodiments provide a computer program product including a non-transitory storage medium including program code to be executed by processing circuitry (430) of a decoder (400), whereby execution of the program code causes the network node to perform operations illustrated in FIGS. 1 to 3.

Figure 4:
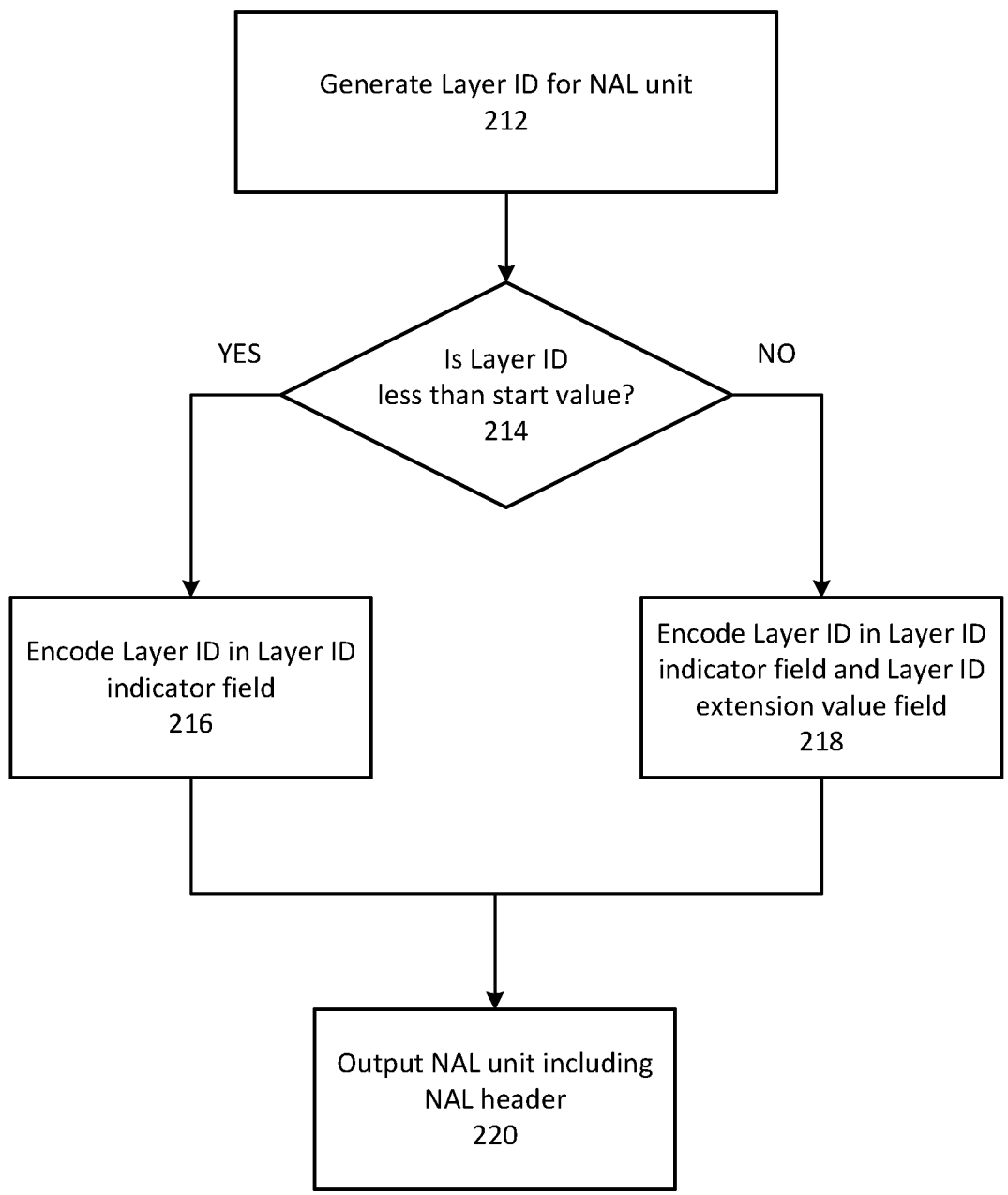
FIGS. 4 and 5 are flowcharts illustrating operations of an encoder according to some embodiments.

A method of encoding an image according to some embodiments is illustrated in FIG. 4. As shown therein, the method includes generating (212) a Layer ID value for a NAL unit of the image. The encoder determines (214) whether the Layer ID value is less than a start value, and in response to determining that the Layer ID value is less than the start value, encodes (216) the Layer ID value in a first field of an NAL header for the NAL unit. In response to determining that the Layer ID value is not less than the start value, the encoder encodes (218) the Layer ID value in the first field of the NAL header and a second field of the NAL header. The encoder then outputs (220) the NAL unit including the NAL header in the encoded image.

Encoding the Layer ID value may include encoding a Layer ID indicator in the first field of the NAL header and an extension value in the second field of the NAL header, where the Layer ID indicator and the extension value are derived from the Layer ID value.

The Layer ID indicator, F, and the extension value, S, may be generated according to the equations [5a] and [6a] or [5b] and [6b] above.

In some embodiments, the start value may be 127 or 32.

In some embodiments, the first field of the NAL header and a nuh_layer_id field and the second field of the NAL header may be a nuh_layer_id_extension_value field.

The method may further include determining whether the Layer ID value is less than a second value, and encoding the Layer ID value in the first field of the NAL header and the second field of the NAL header may be performed in response to determining that the Layer ID value is less than the second value.

Figure 5:
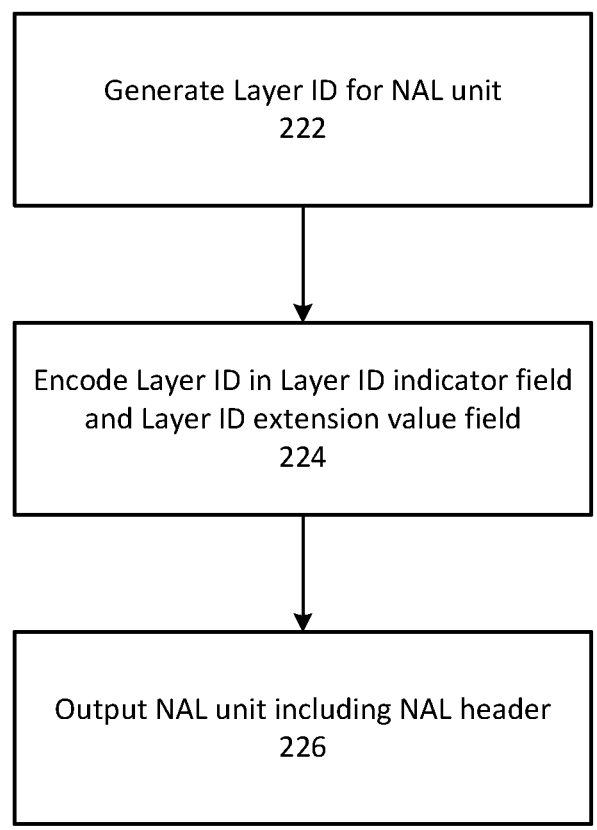

A method of encoding an image according to further embodiments is illustrated in FIG. 5. The method includes generating (222) a layer identification, Layer ID, value for a network abstraction layer, NAL, unit of the image, encoding (224) the Layer ID value in the first field of a NAL header for the NAL unit and a second field of the NAL header, wherein encoding the Layer ID value includes encoding a Layer ID indicator in the first field of the NAL header and an extension value in the second field of the NAL header, wherein the Layer ID indicator and the extension value are derived from the Layer ID value, and outputting (226) the NAL unit including the NAL header in the encoded image.

An encoder (100) according to some embodiments is adapted to perform operations illustrated in FIG. 4 or 5. For example, an encoder (100) according to some embodiments includes a processing circuitry (130), and a memory (140) coupled to the processing circuitry, wherein the memory includes computer readable instructions that when executed by the processing circuitry cause the processing circuitry to perform operations illustrated in FIGS. 4 and/or 5.

A computer program product according to some embodiments includes a non-transitory storage medium including program code to be executed by processing circuitry (130) of an encoder (100), whereby execution of the program code causes the network node to perform operations illustrated in FIGS. 4 and/or 5.

Figure 6A:
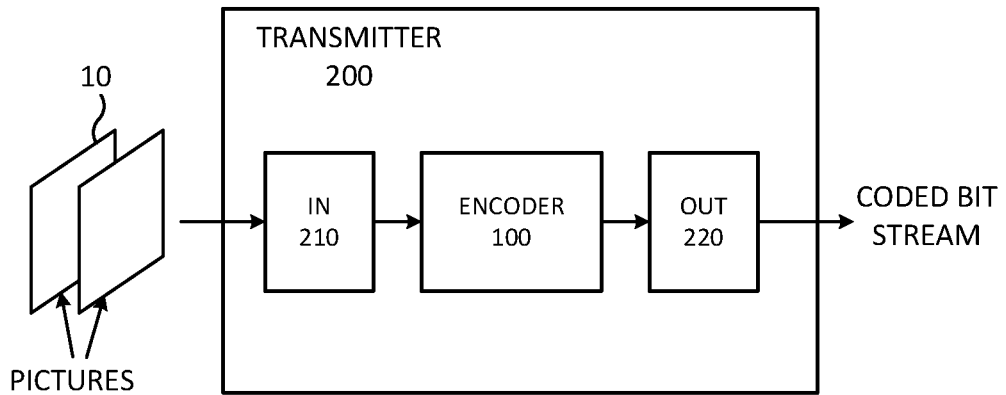
FIG. 6A is a block diagram illustrating a transmitter including an encoder according to some embodiments.

FIG. 6A illustrates a block diagram of a transmitter 200 including an encoder 100. The transmitter 200 includes an input section 210 configured to receive multiple pictures 10 of a video stream. The pictures 10 are forwarded to an encoder 100, which is configured to encode the multiple pictures 10 to generate respective encoded representations of the multiple pictures. An output section 220 of the transmitter 200 is configured to output the respective encoded representations of the multiple pictures as a coded bitstream.

Figure 6B:
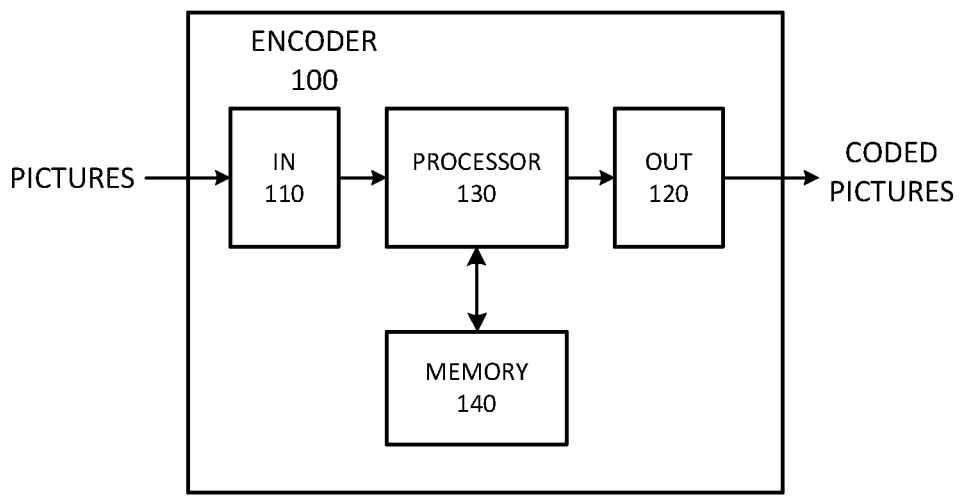
FIG. 6B is a block diagram illustrating an encoder according to some embodiments.

FIG. 6B illustrates an embodiment of an encoder 100 which includes an input section 110 configured to receive multiple pictures of a video stream. The encoder 100 also includes a processing circuitry 130 configured to process instructions of a computer program stored in a memory 140. The instructions cause, when run on the processing circuitry 130, the processing circuitry 130 to perform operations illustrated in FIGS. 4 and 5. The processing circuitry 130 may be a general purpose or specially adapted computer, processor or microprocessor, such as a central processing unit (CPU).

The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks.

In some embodiments, the encoder 100 can be implemented entirely in hardware. Particular examples of hardware implementation of the encoder 100 is implementation in digital signal processor (DSP) hardware and integrated circuit technology, including both general-purpose electronic circuitry and application-specific circuitry.

Figure 7A:
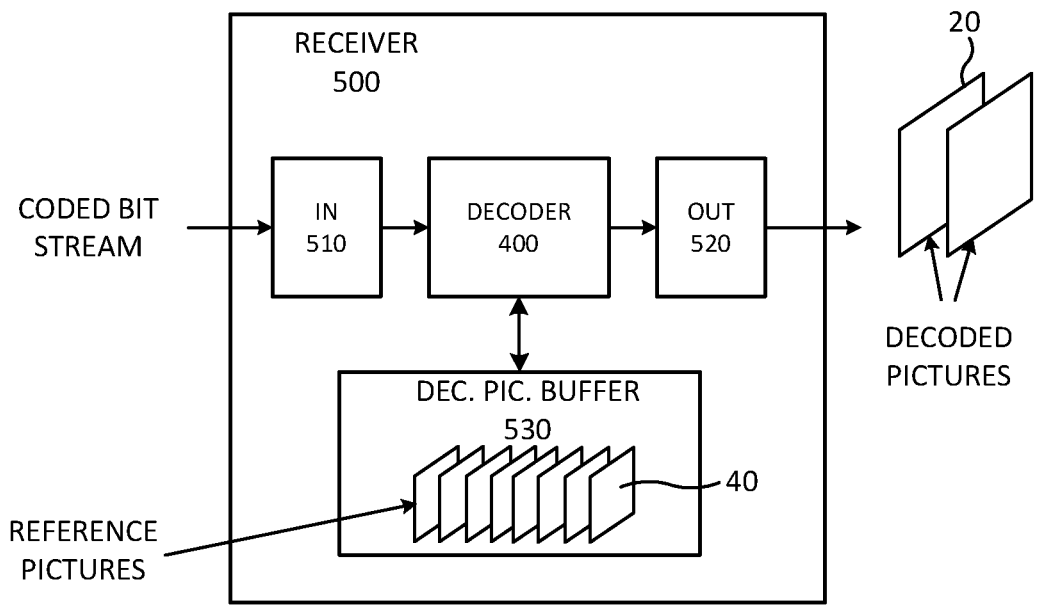
FIG. 7A is a block diagram illustrating a receiver including a decoder according to some embodiments.

FIG. 7A is a block diagram of a receiver 500 including a decoder 400. The receiver 500 includes an input section 510 configured to receive encoded representations of multiple pictures of a video stream. The encoded representations are forwarded to a decoder 400 which is configured to decode the encoded representations of the multiple pictures. An output section 520 of the receiver 500 is configured to output decoded pictures of the video stream. The receiver 500 also includes a decoded picture buffer 530 storing reference pictures to be used by the decoder 400 when decoding the pictures.

Figure 7B:
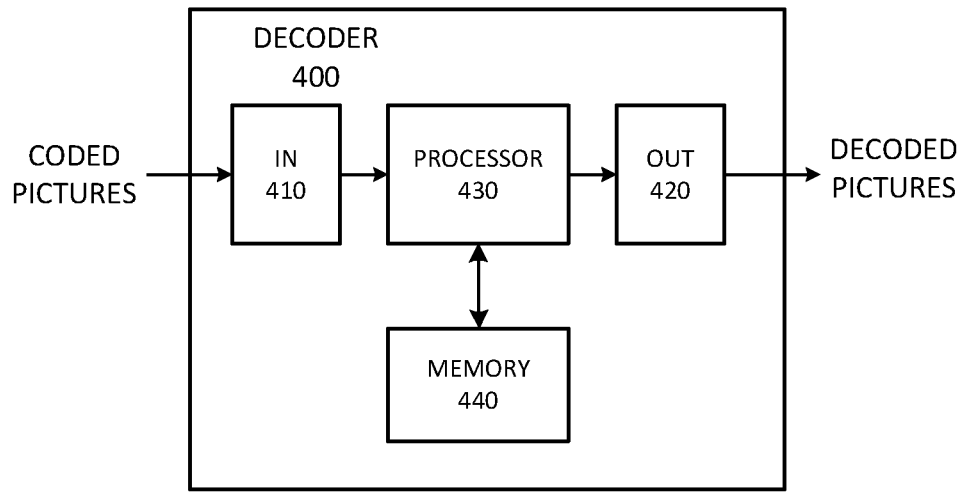
FIG. 7B is a block diagram illustrating a decoder according to some embodiments.
Figure 8:
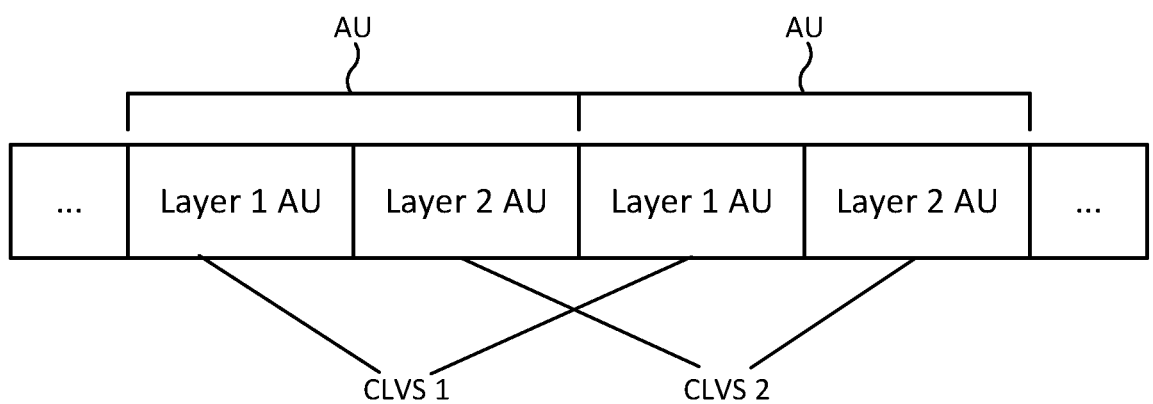
FIG. 8 illustrates a relation between the layer access units and coded layer video sequences.

Referring to FIG. 7B, the decoder 400 includes an input section 410 configured to receive encoded representations of multiple pictures of a video stream. The decoder 400 also includes a processor 430 configured to process instructions of a computer program stored in a memory 440. The instructions cause, when run on the processor 430, the processor 430 to perform the operations illustrated in FIGS. 1 to 3. The decoder 400 also includes an output section 420 configured to output the decoded pictures of the video stream.

The processor 430 may be a general purpose or specially adapted computer, processor or microprocessor, such as a central processing unit (CPU). The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks.

In some embodiments, the decoder can be implemented in hardware. Particular examples of hardware implementation of the decoder 400 is implementation in digital signal processor (DSP) hardware and integrated circuit technology, including both general-purpose electronic circuitry and application-specific circuitry.

LISTING OF EXAMPLE EMBODIMENTS

Example Embodiments are discussed below. Reference numbers/letters are provided in parenthesis by way of example/illustration without limiting example embodiments to particular elements indicated by reference numbers/letters.

Embodiment 1. A method of decoding an encoded image, comprising:
  obtaining a layer identification, Layer ID, indicator from a first field of a header for a network abstraction layer, NAL, unit of the encoded image;
  determining whether the Layer ID indicator is less than a start value;
  in response to determining that the Layer ID indicator is not less than the start value, determining the Layer ID value based on the Layer ID indicator and based on an extension value provided in a second field of the header; and
  decoding the NAL unit based on the Layer ID value.

Embodiment 2. The method of Embodiment 1, wherein determining the Layer ID value from the Layer ID indicator and from the extension value comprises generating the Layer ID value according to the formula:

$$\text{Layer ID value} = V0 + (F - V0) * 2^n + S$$

where V0 is the start value, F is determined from the Layer ID indicator, S is the extension value, and n is a number of bits used to represent the extension value.

Embodiment 3. The method of Embodiment 1, wherein determining the Layer ID value from the Layer ID indicator and from the extension value comprises generating the Layer ID value according to the formula:

$$\text{Layer ID value} = V0 + ((F - V0) << n) + S$$

where V0 is the start value, F is determined from the Layer ID indicator, S is the extension value, and n is a number of bits used to represent the extension value.

Embodiment 4. The method of Embodiment 2 or 3, wherein F is equal to the Layer ID indicator.

Embodiment 5. The method of Embodiment 2 or 3, wherein F is equal to the Layer ID indicator minus 1.

Embodiment 6. The method of Embodiment 2 or 3, wherein v0 is conditioned to be smaller than F.

Embodiment 7. The method of any previous Embodiment, wherein determining the Layer ID value of the NAL unit from the Layer ID indicator in response to determining that the Layer ID indicator is less than the start value comprises determining that the Layer ID value is equal to the Layer ID indicator.

Embodiment 8. The method of any previous Embodiment, wherein the start value is 127.

Embodiment 9. The method of any previous Embodiment, wherein the start value is 32.

Embodiment 10. The method of any previous Embodiment, wherein the first field of the header is a nuh_layer_id field.

Embodiment 11. The method of any previous Embodiment, wherein the second field of the header is a nuh_layer_id_extension_value field.

Embodiment 12. The method of any previous Embodiment, further comprising:
  determining whether the Layer ID indicator is less than a second value;
  wherein determining the Layer ID value from the Layer ID indicator and from the extension value is performed in response to determining that the Layer ID indicator is less than the second value.

Embodiment 13. The method of any previous Embodiment, wherein the encoded image comprises part of an encoded video stream.

Embodiment 14. A method of decoding an encoded image, comprising:
  obtaining a layer identification, Layer ID, indicator from a first field of a header for a network abstraction layer, NAL, unit of the encoded image;
  obtaining an extension value provided in a second field of the header;
  determining a Layer ID value for the NAL unit from the Layer ID indicator and from the extension value; and
  decoding the NAL unit based on the Layer ID value.

Embodiment 15. A method of decoding an encoded image, comprising:
  obtaining a parameter indicator from a first field of a header for a network abstraction layer, NAL, unit of the encoded image;
  determining whether the parameter indicator is within a predetermined range;
  in response to determining that the parameter indicator is outside the predetermined range, determining the first parameter of the NAL unit based on the parameter indicator and based on an extension value provided in a second field of the header; and
  decoding the NAL unit based on the first parameter.

Embodiment 16. The method of claim 15, wherein the parameter indicator comprises a layer identification, Layer ID, indicator, and wherein the first parameter comprises a Layer ID value.

Embodiment 17. The method of claim 16, wherein determining whether the parameter indicator is within the predetermined range comprises determining whether the parameter indicator is less than a start value.

Embodiment 18. A decoder (100), comprising:
  a processing circuitry (103); and
  a memory (105) coupled to the processing circuitry, wherein the memory comprises computer readable instructions that when executed by the processing circuitry cause the processing circuitry to perform operations according to any of Embodiments 1 to 17.

Embodiment 19. A decoder (100), wherein the decoder is adapted to perform operations according to any of Embodiments 1 to 17.

Embodiment 20. A computer program product comprising a non-transitory storage medium including program code to be executed by processing circuitry (103) of a decoder (100), whereby execution of the program code causes the network node to perform operations according to any of Embodiments 1 to 17.

Embodiment 21. A method of encoding an image, comprising:
  generating a layer identification, Layer ID, value for a network abstraction layer, NAL, unit of the image;
  determining whether the Layer ID value is less than a start value;
  in response to determining that the Layer ID value is not less than the start value, encoding the Layer ID value in the first field of the NAL header and a second field of the NAL header; and
  outputting the NAL unit including the NAL header.

Embodiment 22. The method of Embodiment 21, wherein encoding the Layer ID value comprises encoding a Layer ID indicator in the first field of the NAL header and an extension value in the second field of the NAL header, wherein the Layer ID indicator and the extension value are derived from the Layer ID value.

Embodiment 23. The method of Embodiment 21, wherein the Layer ID indicator, F, and the extension value, S, are generated according to the formula:

$S = (\text{Layer ID value} - V0) \% 2^n$ $F = (\text{Layer ID value} - V0 - S) >> n + V0$ where V0 is the start value and n is a number of bits used to represent the extension value.

Embodiment 24. The method of Embodiment 21, wherein the Layer ID indicator, F, and the extension value, S, are generated according to the formula:

$S = (\text{Layer ID value} - V0) \& (2^n - 1)$ $F = (\text{Layer ID value} - V0 - S) >> n + V0$ where V0 is the start value and n is a number of bits used to represent the extension value.

Embodiment 25. The method of any of Embodiments 21 to 24, wherein the start value is 127.

Embodiment 26. The method any of Embodiments 21 to 25, wherein the start value is 32.

Embodiment 27. The method of any of Embodiments 21 to 26, wherein the first field of the NAL header is a nuh_layer_id field.

Embodiment 28. The method of any of Embodiments 21 to 27, wherein the second field of the NAL header is a nuh_layer_id_extension_value field.

Embodiment 29. The method of any of Embodiments 21 to 28, further comprising:
  determining whether the Layer ID value is less than a second value;
  wherein encoding the Layer ID value in the first field of the NAL header and the second field of the NAL header is performed in response to determining that the Layer ID value is less than the second value.

Embodiment 30. A method of encoding an image, comprising:
  generating a layer identification, Layer ID, value for a network abstraction layer, NAL, unit of the image;
  encoding the Layer ID value in the first field of a NAL header for the NAL unit and a second field of the NAL header, wherein encoding the Layer ID value comprises encoding a Layer ID indicator in the first field of the NAL header and an extension value in the second field of the NAL header, wherein the Layer ID indicator and the extension value are derived from the Layer ID value; and
  outputting the NAL unit including the NAL header.

Embodiment 31. The method of Embodiment 30, wherein the Layer ID indicator, F, and the extension value, S, are generated according to the formula:

$S = (\text{Layer ID value} - V0) \& 2^n$ $F = (\text{Layer ID value} - V0 - S) >> n + V0$ where V0 is the start value and n is a number of bits used to represent the extension value.

Embodiment 32. The method of Embodiment 30, wherein the Layer ID indicator, F, and the extension value, S, are generated according to the formula:

$S = (\text{Layer ID value} - V0) \& (2^n - 1)$ $F = (\text{Layer ID value} - V0 - S) >> n + V0$ where V0 is the start value and n is a number of bits used to represent the extension value.

Embodiment 33. An encoder (200), comprising:
  a processing circuitry (203); and
  a memory (205) coupled to the processing circuitry, wherein the memory comprises computer readable instructions that when executed by the processing circuitry cause the processing circuitry to perform operations according to any of Embodiments 21 to 32.

Embodiment 34. An encoder (200), wherein the encoder is adapted to perform operations according to any of Embodiments 21 to 32.

Embodiment 35. A computer program product comprising a non-transitory storage medium including program code to be executed by processing circuitry (203) of an encoder (200), whereby execution of the program code causes the network node to perform operations according to any of Embodiments 21 to 32.

Explanations for abbreviations from the above disclosure are provided below.

Abbreviation Explanation
AU Access Unit
AUD Access Unit Delimiter
BLA Broken Link Access
CLVS Coded Layer Video Sequence
CRA Clean Random Access
CVS Coded Video Sequence
GRA Gradual Random Access
HEVC High Efficiency Video Coding
IDR Instant Decoder Refresh
IRAP Intra Random Access Point
JVET Joint Video Exploration Team
NAL Network Abstraction Layer
RADL Random Access Decodable Leading
RASL Random Access Skipped Leading
SEI Supplemental Enhancement Information
VVC Versatile Video Coding
VCL Video Coding Layer Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the foregoing description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of decoding an encoded image, comprising:
   obtaining a layer identification (Layer ID) indicator from a first field of a header for a network abstraction layer (NAL) unit of the encoded image;
   determining whether the Layer ID indicator is less than a start value;
   in response to determining that the Layer ID indicator is not less than the start value, determining the Layer ID value based on the Layer ID indicator, an extension value provided in a second field of the header, and a number of bits used to represent the extension value; and
   decoding the NAL unit based on the Layer ID value.

2. The method of claim 1, wherein determining the Layer ID value comprises generating the Layer ID value according to one of the formulae:

$$\text{Layer ID value} = V0 + (F - V0) * 2^n + S$$

where V0 is the start value, F is determined from the Layer ID indicator, S is the extension value, and n is the number of bits used to represent the extension value; and $$\text{Layer ID value} = V0 + ((F - V0) << n) + S$$

where V0 is the start value, F is determined from the Layer ID indicator, S is the extension value, << is the left-shift operator, and n is the number of bits used to represent the extension value.

3. The method of claim 2, wherein F is equal either to the Layer ID indicator or to the Layer ID indicator minus a constant.

4. The method of claim 2, wherein V0 is conditioned to be smaller than F.

5. The method of claim 1, wherein determining the Layer ID value of the NAL unit from the Layer ID indicator in response to determining that the Layer ID indicator is less than the start value comprises determining that the Layer ID value is equal to the Layer ID indicator.

6. The method of claim 1, further comprising, in response to determining that the Layer ID indicator is not less than the start value, determining that the second field is present.

7. The method of claim 1, wherein at least one of:
   the first field of the header is a nuh_layer_id field; and
   the second field of the header is a nuh_layer_id_extension_value field.

8. The method of claim 1, further comprising:
   determining whether the Layer ID indicator is less than a second value;
   wherein determining the Layer ID value from the Layer ID indicator and from the extension value is performed in response to determining that the Layer ID indicator is less than the second value.

9. The method of claim 1, wherein the encoded image comprises part of an encoded video stream.

10. A method of decoding an encoded image, comprising:
    obtaining a parameter indicator from a first field of a header for a network abstraction layer (NAL) unit of the encoded image;
    determining whether the parameter indicator is within a predetermined range;
    in response to determining that the parameter indicator is outside the predetermined range, determining a first parameter of the NAL unit based on the parameter indicator, an extension value provided in a second field of the header, and a number of bits used to represent the extension value; and
    decoding the NAL unit based on the first parameter.

11. The method of claim 10, wherein the parameter indicator comprises a layer identification, Layer ID, indicator, and wherein the first parameter comprises a Layer ID value.

12. The method of claim 11, wherein determining the Layer ID value comprises generating the Layer ID value according to one of the formulae:

$$\text{Layer ID value} = V0 + (F - V0) * 2^n + S$$

where V0 is the start value, F is determined from the Layer ID indicator, S is the extension value, and n is the number of bits used to represent the extension value; and $$\text{Layer ID value} = V0 + ((F - V0) << n) + S$$

where V0 is the start value, F is determined from the Layer ID indicator, S is the extension value, << is the left-shift operator, and n is the number of bits used to represent the extension value.

13. A decoder, comprising:
    a processing circuitry; and
    a memory coupled to the processing circuitry, wherein the memory comprises computer readable instructions that when executed by the processing circuitry cause the decoder to perform operations in decoding an encoded image, comprising:
    obtaining a layer identification (Layer ID) indicator from a first field of a header for a network abstraction layer (NAL) unit of the encoded image;
    determining whether the Layer ID indicator is less than a start value;
    in response to determining that the Layer ID indicator is not less than the start value, determining the Layer ID value based on the Layer ID indicator, an extension value provided in a second field of the header, and a number of bits used to represent the extension value; and
    decoding the NAL unit based on the Layer ID value.

14. A computer program product, comprising a non-transitory storage medium including program code to be executed by processing circuitry of a decoder, whereby execution of the program code causes the decoder to perform operations in decoding an encoded image, comprising:
    obtaining a layer identification (Layer ID) indicator from a first field of a header for a network abstraction layer (NAL) unit of the encoded image;
    determining whether the Layer ID indicator is less than a start value;
    in response to determining that the Layer ID indicator is not less than the start value, determining the Layer ID value based on the Layer ID indicator, an extension value provided in a second field of the header, and a number of bits used to represent the extension value; and
    decoding the NAL unit based on the Layer ID value.

15. A method of encoding an image, comprising:
    generating a layer identification (Layer ID) value for a network abstraction layer (NAL) unit of the image;
    determining whether the Layer ID value is less than a start value;
    in response to determining that the Layer ID value is not less than the start value, encoding the Layer ID value in a first field of the NAL header and a second field of the NAL header, wherein the encoding the Layer ID value comprises encoding a Layer ID indicator in the first field of the NAL header and an extension value in the second field of the NAL header, wherein the Layer ID indicator and the extension value are derived from the Layer ID value and a number of bits used to represent the extension value; and outputting the NAL unit including the NAL header.

16. The method of claim 15, wherein the Layer ID indicator, F, and the extension value, S, are generated according to one of the formulae:

$$S = (\text{Layer ID value} - V0) \% 2^n$$

$$F = (\text{Layer ID value} - V0 - S) >> n + V0$$

where V0 is the start value, % is the modulo operator, >> is the right-shift operator, and n is the number of bits used to represent the extension value; and $$S = (\text{Layer ID value} - V0) \& (2^n - 1)$$

$$F = (\text{Layer ID value} - V0 - S) >> n + V0$$

where V0 is the start value, where & is the binary AND operator, and n is the number of bits used to represent the extension value.

17. The method of claim 15, further comprising:

determining whether the Layer ID value is less than a second value;

wherein encoding the Layer ID value in the first field of the NAL header and the second field of the NAL header is performed in response to determining that the Layer ID value is less than the second value.

18. An encoder, comprising:

a processing circuitry; and a memory coupled to the processing circuitry, wherein the memory comprises computer readable instructions that when executed by the processing circuitry cause the encoder to perform operations in encoding an image, comprising:

generating a layer identification (Layer ID) value for a network abstraction layer (NAL) unit of the image;

determining whether the Layer ID value is less than a start value;

in response to determining that the Layer ID value is not less than the start value, encoding the Layer ID value in a first field of the NAL header and a second field of the NAL header, wherein the encoding the Layer ID value comprises encoding a Layer ID indicator in the first field of the NAL header and an extension value in the second field of the NAL header, wherein the Layer ID indicator and the extension value are derived from the Layer ID value and a number of bits used to represent the extension value; and outputting the NAL unit including the NAL header.

19. A computer program product, comprising a non-transitory storage medium including program code to be executed by processing circuitry of an encoder, whereby execution of the program code causes the encoder to perform operations in encoding an image, comprising:

generating a layer identification (Layer ID) value for a network abstraction layer (NAL) unit of the image;

determining whether the Layer ID value is less than a start value;

in response to determining that the Layer ID value is not less than the start value, encoding the Layer ID value in a first field of the NAL header and a second field of the NAL header, wherein the encoding the Layer ID value comprises encoding a Layer ID indicator in the first field of the NAL header and an extension value in the second field of the NAL header, wherein the Layer ID indicator and the extension value are derived from the Layer ID value and a number of bits used to represent the extension value; and outputting the NAL unit including the NAL header.

* * * * *